Nov. 21, 1950     M. W. VAN SCOYK     2,530,411
VULCANIZING SPOT PRESS
Filed April 9, 1946     2 Sheets-Sheet 1
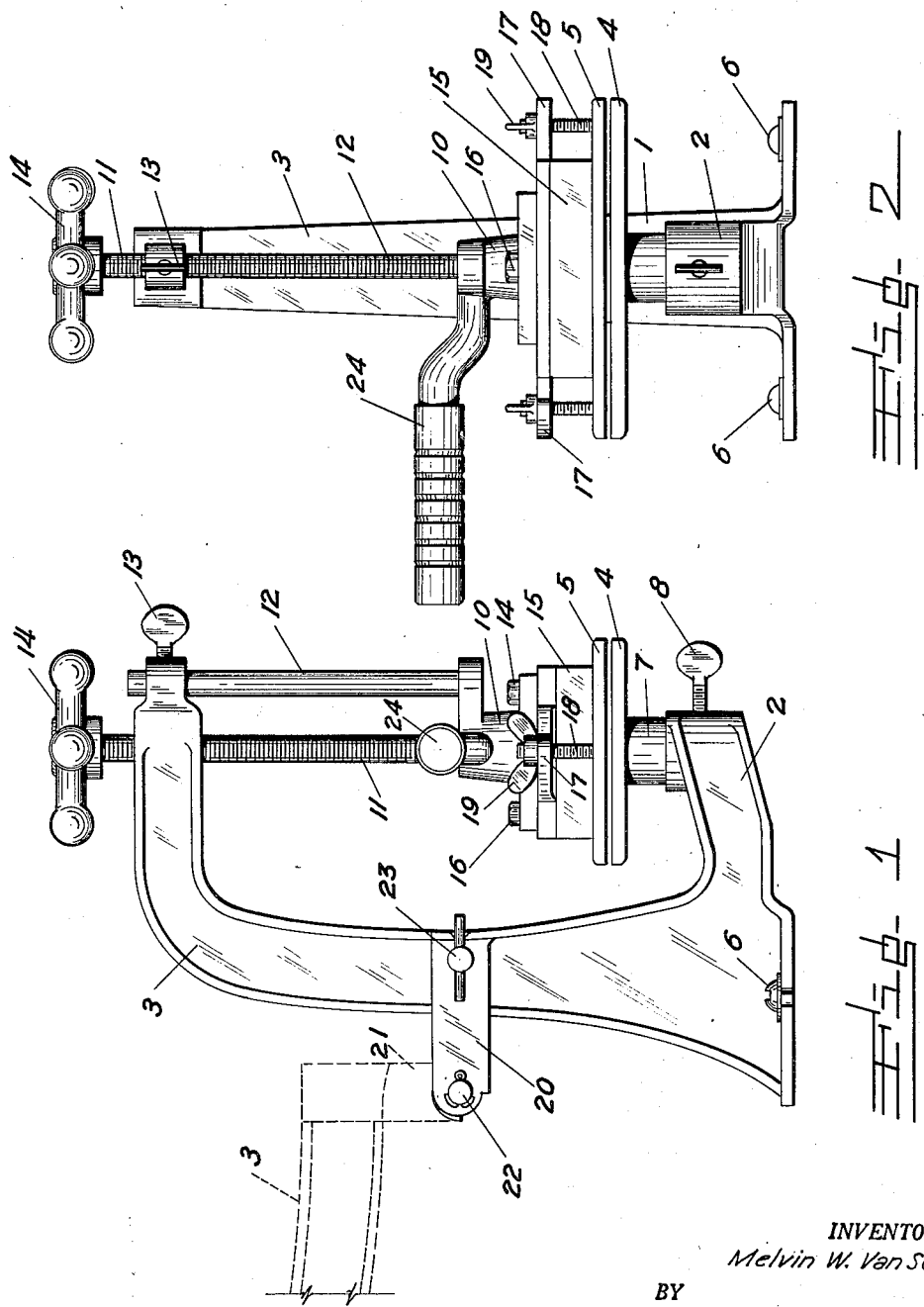
INVENTOR.
Melvin W. Van Scoyk
BY
ATTORNEY

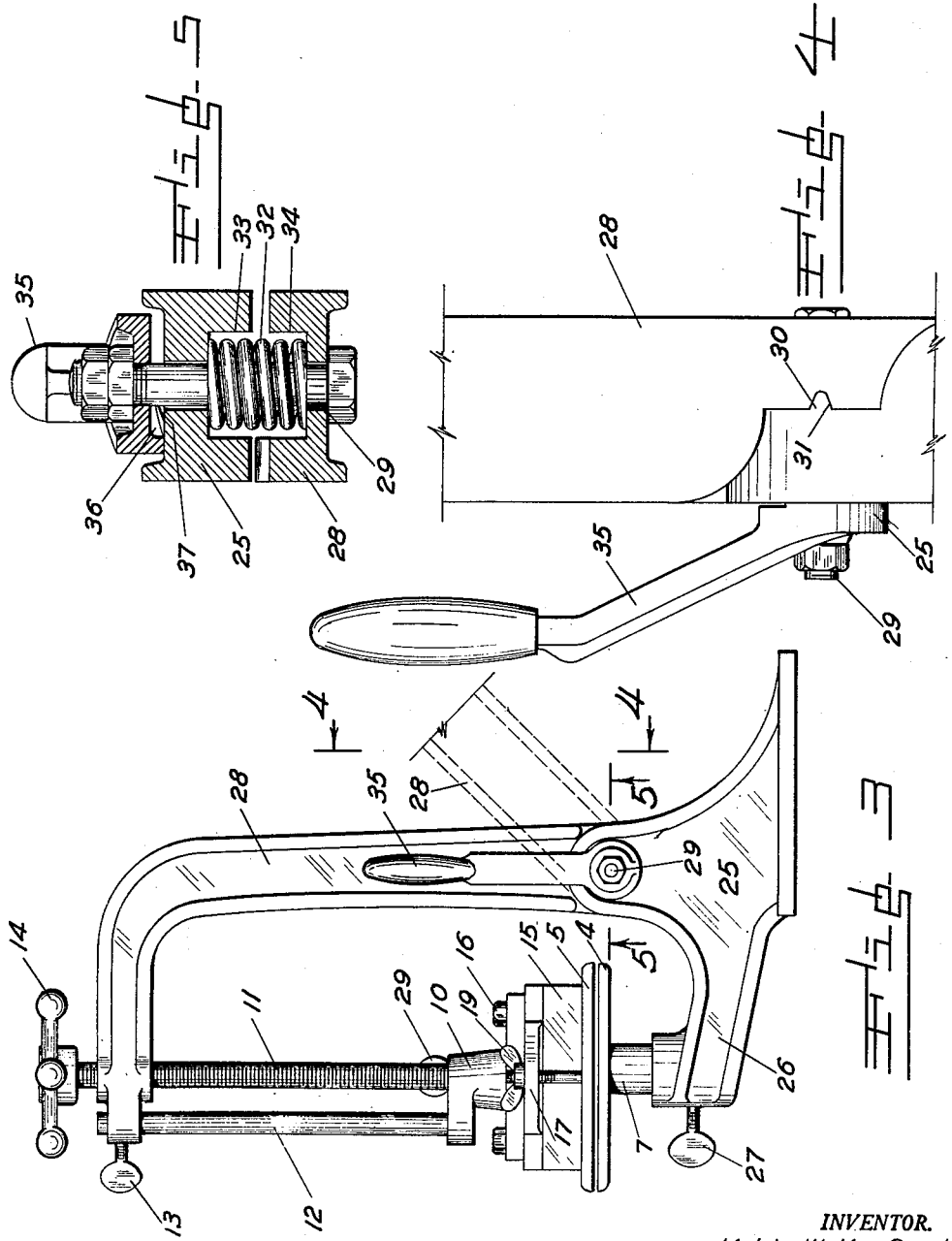

Patented Nov. 21, 1950

2,530,411

UNITED STATES PATENT OFFICE 2,530,411

VULCANIZING SPOT PRESS

Melvin W. Van Scoyk, Denver, Colo., assignor to Winner Equipment Company, Denver, Colo., a corporation of Colorado Application April 9, 1946, Serial No. 660,667

2 Claims. (Cl. 18—18)

This invention relates to presses for holding inner tubes and the like during the vulcanizing of spots or patches thereon.

Small heated plate presses are employed for vulcanizing repair patches on inner tubes and the like. It is desirable that the plates or molds be readily detachable so that a variety of shapes of mold surfaces may be employed interchangeably. Furthermore, it is desirable that the pairs of complementary molds employed in such presses be easily and quickly movable into and out of their operative position and that the spacing of the pairs of molds be easily adjustable. Accordingly, it is an object of my invention to provide a vulcanizing press including an improved arrangement for facilitating the adjustment of the molds with respect to one another.

It is another object of this invention to provide a vulcanizing press including an improved arrangement for securing ready and free access to the molds.

Other objects of this invention will become apparent as the following description proceeds and the features of novelty which characterize this invention will be pointed out with particularity in the claims annexed to and forming a part of this specification.

Fig. 1 is a side elevation view of a vulcanizing press embodying this invention;

Fig. 2 is a front elevation view of the press of Fig. 1;

Fig. 3 is a side elevation view of a vulcanizing press illustrating another embodiment of this invention;

Fig. 4 is an enlarged view of the portion 4—4 of Fig. 3; and

Fig. 5 is an enlarged sectional view on the line 5—5 of Fig. 3.

Referring now to the drawing, the press illustrated in Figs. 1 and 2 comprises a base or support 1 provided with frame members or arms 2 and 3 forming a C-shaped frame between the arms of which a pair of complementary molds or press plates 4 and 5 are mounted. The support 1 is securely held on a suitable bench or table by bolts 6. The mold 4 is provided with a post or attaching lug 7 which is securely held in a socket in the stationary arm 2 by a set screw 8. The post 7 and its socket are made preferably of a cross section shaped so that the mold 4 can be secured in the arm 1 in only one position; for example, the cross section might be that of a triangle with one side smaller than the others. The mold 5 is secured on an adjustable device or attachment 9 mounted on the arm 3.

The attachment 9 includes a block 10 mounted in the frame member 3 on an adjusting screw 11 so that the mold 5 can be raised and lowered in alinement with the complementary mold 4. Lateral displacement and twisting of the block 10 are prevented by a guide rod 12 rigidly secured to the block and slidably mounted in the arm 3. The block may be locked in position by tightening a set screw 13 in the end of the arm 3 and which engages the rod 12. The screw 11 is provided with a handle or wheel 14 to facilitate quick adjustment.

In order to provide the heat necessary for the vulcanizing operation, an electric heater 15 is included in the device 9 and forms the connecting member between the block 10 and the mold 5. The heater 15 is secured to the block 10 on bolts 16 and is provided with clamping ears 17 to which the mold 5 is detachably secured by threaded posts 18 and wing nuts 19. The electrical connections to the heater have not been shown but obviously can be made through suitable flexible cables in the manner well known in electric appliance practice.

It is desirable to separate the mold plates 4 and 5 quickly when inserting or removing the article to be vulcanized, and to accomplish this purpose the arm 3 is pivotally mounted on the support 1 so that it may be swung out of the way. Thus the molds 4 and 5 may be separated quickly without changing the setting of the adjusting device 9. As shown in Fig. 1 the support 1 is provided with a rearwardly offset bifurcated extension 20 between the sides of which is located an offset portion of the arm 3 as indicated at 21 in dotted lines in Fig. 1, the dotted lines being employed to illustrate a portion of the arm 3 in its rearwardly rotated position. The extension 20 and portion 21 are pivoted together on a pin 22. It will thus be apparent that the arm 3 may be swung rearwardly so that the device 9 and attached mold 5 are well out of the way of the working area above the mold 4. Easy access is thus afforded for adjusting or replacing the molds. In order to lock the arm 3 in its upright position and hold the mold 5 in its operative position over the mold 4 a pin 23 is inserted in suitable openings in the support 1 and arm 3. A handle 24 secured to the block 10 is provided for manipulating the arm 3.

During the operation of the press of Figs. 1 and 2 the arm 3 is swung rearwardly and a selected pair of molds 4 and 5 are secured in position on the support 1 and device 9, respectively. The arm is then swung forwardly, the screw 11 being in a position to hold the mold 5 well away from the mold 4. The pin 23 is inserted and the work is placed on the mold 4; the mold 5 is then lowered by turning the handle 14 until the mold 5 reaches its operating position. Heat is then applied by energizing the heater 15 until the vulcanizing process has been completed. Thereupon the pin 23 is removed to unlock the arm 3 which is swung rearwardly to release the work. Subsequent operations on work requiring the same molds and spacing of the molds may be accomplished without readjustment of the screw 11, the guide rod 12 being locked in position by the screw 13 to maintain the setting.

The vulcanizing press illustrated in Fig. 3 is similar to that shown in Figs. 1 and 2 and corresponding parts have been designated by the same numerals. The press of Fig. 3 differs from that of Fig. 1 in its arrangement for pivoting the upper supporting arm on the base. As shown in Fig. 3 the press comprises a base or support 25 having a rigid arm of frame member 26 in the end of which the post 7 of the mold 4 is secured by a set-screw 27. The adjusting device 9 is mounted in an arm or frame member 28 similar to the arm 3 of Fig. 1 but pivoted directly on the base 25 without the intermediate offset arms. The adjustment and positioning of the molds on the frame members 26 and 28 is the same as described in connection with the press of Figs. 1 and 2. The arm 28 is pivoted directly on the support 25 on a pin or bolt 29. In order to lock the arm 28 in its operative position on the base 25 a tongue 30 is provided on the base 5 which is arranged to fit in a groove 31 in the arm 28 when the arm is in its upright position. The arm 28 is biased away from the base 25 by a spring 32 arranged about the bolt 29 in recesses 33 and 34 formed in the base and arm, respectively. The force of the spring may be overcome to lock the arm 28 in its upright position by turning a handle 35 which rotates a cam surface 36 over a ramp or cam 37 formed on the base 25 and draws the arm 28 against the base for interengaging the tongue and groove. The arm may thus be locked in position and then, after the vulcanizing process is completed, it may be released quickly by turning the handle 35, so that the arm may be swung out of the way to release the work. This construction thus provides a positive lock for holding the frame members in their operative position and also affords quick release of the lock for releasing the work.

It is apparent from the foregoing that I have provided a press for spot vulcanizing of inner tubes and the like which is easy to operate and which greatly facilitates the mounting and adjustment of the molds anad the carrying out of the vulcanizing process.

Although I have illustrated and described particular embodiments of my invention, other arrangements will occur to those skilled in the art. I do not, therefore, desire my invention to be limited to the specific construction illustrated and I intend by the appended claims to cover all embodiments within the spirit and scope of my invention.

What I claim and desire to secure by Letters Patent is:

1. A vulcanizing press for inner tubes and the like comprising a base member, a mold member on said base, threaded means for securing said mold member in a fixed position on said base, a frame member pivotally mounted on said base member having a threaded passage in its outer extremity, a threaded member for engagement in said passage, a second mold member mounted on said threaded member for movement therewith, guide means for positioning said second mold member with respect to said frame member, means for releasably securing said guide means to said frame member, a heating plate contiguous with said second mold member, a raised portion on said base member and a complementary recessed portion formed on said frame member for locking said frame member in a position of registration with said base member, a cam member for urging said raised and recessed portions into engagement to align said mold members, and a spring for urging said portions out of engagement when the cam is released to allow pivotal movement of said frame member facilitating the removal of materials from between said mold members.

2. A vulcanizing press for inner tubes and the like comprising a base member, a mold member on said base, means for securing said mold in a fixed position on said base, a frame member pivotally mounted on said base member, a second mold member adjustably mounted on said frame member, guide means for positioning said second mold member in a fixed position with respect to said frame member, means for releasably securing said guide means to said frame member, a heating plate contiguous with said second mold member, a raised portion on said base member and a complementary recessed portion formed on said frame member for locking said frame member in a position of registration with said base member, a cam member for urging said raised and recessed portions into engagement to align said mold members, and a spring for urging said portions out of engagement when the cam is released to allow pivotal movement of said frame member facilitating the removal of materials from between said mold members.

MELVIN W. VAN SCOYK.

REFERENCES CITED

The following references are of record in the file of this patent:

UNITED STATES PATENTS

| Number | Name | Date |
|---|---|---|
| 1,718,485 | O'Sullivan | June 25, 1929 |
| 2,163,876 | Hill | June 27, 1939 |
| 2,189,296 | Oskow | Feb. 6, 1940 |
| 2,219,419 | Jacobus | Oct. 29, 1940 |
| 2,290,106 | Longstreet | July 14, 1942 |
| 2,356,447 | Cline | Aug. 22, 1944 |
| 2,397,404 | Britt | Mar. 26, 1946 |